United States Patent [19]

Beck et al.

[11] Patent Number: 4,769,436
[45] Date of Patent: Sep. 6, 1988

[54] POLYESTER POLYALCOHOLS CONTAINING AMINO AND AMIDE GROUPS AND POLY (UREA) URETHANE PRODUCED THEREFROM

[75] Inventors: Manfred Beck, Wipperfuerth; Rudolf Hombach, Leverkusen; Walter Meckel, Neuss, all of Fed. Rep. of Germany

[73] Assignee: Bayer Aktiengesellschaft, Leverkusen-Bayerwerk, Fed. Rep. of Germany

[21] Appl. No.: 133,518

[22] Filed: Dec. 16, 1987

[30] Foreign Application Priority Data

Dec. 20, 1986 [DE] Fed. Rep. of Germany ....... 3643788

[51] Int. Cl.$^4$ ............................................. C08G 18/32
[52] U.S. Cl. ..................................... 528/75; 525/451; 528/84; 528/288

[58] Field of Search .......................... 528/75, 84, 288; 525/451

[56] References Cited

U.S. PATENT DOCUMENTS 2,730,033  3/1988  Horley et al. ...................... 528/288
3,715,335  2/1973  Bacskai ............................. 528/288

Primary Examiner—Maurice J. Welsh
Attorney, Agent, or Firm—Connolly and Hutz

[57] ABSTRACT

A process for the manufacture of polyester polyalcohols with amino and amide groups by the reaction of polyester polyalcohols with polyamines is characterized in that unsaturated polyester polyalcohols if necessary in admixture with saturated polyester polyalcohols are used as polyester polyalcohols, and low molecular weight, aliphatic polyamines with two primary amino groups are used as polyamines.

4 Claims, No Drawings

POLYESTER POLYALCOHOLS CONTAINING AMINO AND AMIDE GROUPS AND POLY (UREA) URETHANE PRODUCED THEREFROM

The present invention relates to procedures for the production of polyester polyalcohols containing amide and amino groups by the reaction of polyester polyalcohols with low molecular weight, preferably aliphatic polyamines with two primary amino groups and the use of these polyester polyalcohols containing amino and amide groups for the production of poly(urea)urethanes, which are particularly suitable as adhesives.

Polyester polyalcohols are used in the manufacture of polyurethanes by reaction with polyisocyanates. In the process, there has been no shortage of attempts to accelerate this conversion reaction, in which a multitude of catalysts were used. Catalysts such as e.g. tin compounds, however, have the disadvantage that at higher temperatures the back reaction is also catalysed. Even the use of low molecular weight polyamines as chain extending agents did not always lead to the quick conversion wished for, which is necessary in the application of the so-called 2-component systems for the manufacture of adhesives on a PU-Basis.

A need therefore existed to make available a higher molecular weight polyester polyalcohol component for the manufacture of polyurethane, which displays not only an excellent reactivity with polyisocyanates, but also a sufficient miscibility with polyether polyalcohols preferably branched polyether polyalcohols, on which the suitability as an adhesive component can decisively depend. In addition, the use of low molecular weight diamines should be largely avoided at the place of utilization and hence manufacture of the polyurethane adhesives because of possible olfactory annoyance.

According to the invention this is achieved by modifying the polyester polyalcohol component by the procedure according to the invention and using the modified components in the manufacture of the polyurethane.

One object of the present invention is therefore a procedure for the manufacture of polyester polyalcohols containing amino and amide groups through the reaction of polyester polyalcohols with polyamines, which is characterised in that one uses as polyester polyalcohols unsaturated polyester polyalcohols if necessary in admixture with saturated polyester polyalcohols, and as polyamines low molecular weight, aliphatic polyamines with two primary amino groups.

It is already known from U.S. Pat. No. 37 15 335 to react unsaturated polyesters with diamines which display a primary and a tertiary amino group, and if necessary to let these reaction products react further with diamines with two primary amino groups and to quaternise the products of manufacture at the tertiary nitrogen atoms with epichlorohydrin. These end products are recommended as additives in the manufacture of paper and as a flocculating aid. But a person skilled in the art could in no way deduce from that, that polyester polyalcohols modified exclusively with polyamines, preferably diamines with two primary amino groups, are supremely suited for the manufacture of adhesives on a polyurea polyurethane basis.

Therefore, a further object of the present invention is a process for the manufacture of polyureapolyurethanes, in particular adhesives based on polyurethanes by the reaction of relatively high molecular weight polyester polyalcohols with polyisocyanate and if necessary further conventional auxiliaries and additives, characterised in that polyester polyalcohols containing amino and amide groups are used as polyester polyalcohols, which were manufactured by the reaction of unsaturated polyester polyalcohols, if necessary in admixture with saturated polyester polyalcohols with low molecular weight aliphatic polyamines with two primary amino groups.

The known relatively high molecular weight unsaturated polyester polyalcohols are used for the manufacture of the modified polyester polyalcohols. These are preferably unsaturated polyester polyalcohols with a molecular weight of 400–10000 and a hydroxide number of 10–500, which are obtained through the reaction of polyvalent, preferably bi-valent, $\alpha,\beta$-unsaturated carbonic acids and/or their anhydrides with polyalcohol compounds. In the process maleic acid, fumaric acid, mesaconic acid, citraconic acid and/or dimerised and trimerised unsaturated fatty acids are preferably used as unsaturated polycarbonic acids. Maleic acid anhydride is particularly recommended for use. The unsaturated esters may also by synthesised from saturated aliphatic polycarbonic acids with $C_4$ to $C_{10}$ or aromatic poly carbonic acids with $C_8$ to $C_{16}$, in addition to $\alpha,\beta$-unsaturated polycarbonic acids. Linear or branched, saturated or unsaturated $C_2$ to $C_6$ polyalcohols, preferably diols or mono- or dietherdiols derived therefrom are preferably used as polyalcohol components for synthesis of the unsaturated polyesters.

Ethylene glycol, propylene glycol-1,2 and -1,3, butylene glycol-1,4 and -2,3, hexanediol-1,6, octanediol-1,8, neopentyl glycol-1,4-bis-hydroxymethylcyclohexane 2-methyl-1,3-propanediol and in subordinate amounts more highly functional polyalcohols like glycerine, trimethylolpropane, hexanetriol-1,2,6, butanetriol-1,2,4, trimethylolethane, pentaerythrite, quinitol, mannitol, sorbitol, formitol, methylglycoside, further diethylene glycol, triethylene glycol, tetraethylene glycol and polyethylene glycol, dipropylene glycol and polyethylene glycols as well as dibutylene glycol and polybutylene glycol may be used as polyvalent alcohols. The use of ethylene glycol, diethylene glycol, 1,2-propanediol, dipropylene glycol and neopentyl glycol is particularly preferred.

The mentioned polyalcohol component can also be used for the manufacture of the saturated polyester polyalcohol, which can be added to the unsaturated polyester alcohols to form up to 80%, preferably up to 50% of the total polyester polyalcohol component. As saturated polycarbonic acids or the corresponding anhydrides, preferably those with between 4 and 14 C-Atoms are used, where the polycarbonic acid can be linear or branched aliphatic, cycloaliphatic or aromatic dicarbonic acids, as e.g., succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, Tetrachlorophthalic acid anhydride, phthalic acid dimethylester and terephthalic acid-bisglycolester.

Low molecular weight polyamines, preferably diamines, which display two primary amino groups are preferably used in the reaction with the polyester polyalcohols. These are especially aliphatic diamines with 2 to 6 C-Atoms. It is preferably that amines of the general formula $NH_2$—R—$NH_2$ are used, where R stands for an aliphatic or cycloaliphatic residue with a $C_2$–$C_6$ or a —R$^1$—NH—R$^1$— or —R$^1$—(NH—R$^1$)$_n$— group, where R$^1$ represents an ethylene- or 1,2-propylene radical and n stands for a whole number between 1 and 3. Alkylenediamines, in particular ethylene- and hexamethylenediamine are preferred.

The reaction of the polyester polyalcohol with the amino components can take place in solution or without solvents. Ketones, alcohols, chlorinated hydrocarbons, ethers or esters can be used as solvents. Slightly volatile solvents like methyl ethyl ketone or dioxane, are preferred. In particular, the reaction is preferably carried out without solvents. To this end the polyester polyalcohol component is previously placed in the reaction vessel, if necessary melted and then the amine dripped in. The reaction is preferably carried out at temperatures of between 0° C. and 150° C., particularly preferred are temperatures between 10° C. and 100° C. Following the reaction any amine still present is removed, by warming in a vacuum, in order to isolate the modified polyester polyalcohol components.

The polyester polyalcohol components modified according to the invention are, depending on the choice of original components, viscous to solid substances. They can be characterised by their hydroxyl number, their total nitrogen content and their basic nitrogen. Particularly suitable modified polyester polyalcohols are those whose hydroxyl number lies between 50 and 500, preferably between 150 and 350, and which display a total nitrogen content of 1–7% by weight, preferably 2–5.5% by weight, where the ratio of basic nitrogen to total nitrogen should lie between 1:1 and 1:6, preferably between 1:2 and 1:5. In order to achieve a sufficiently rapid reaction with the polyisocyanates with the addition of the polyester polyalcohol according to the invention for the manufacture of adhesives on a PU-Basis, the polyester polyalcohol should display a content of basic nitrogen of between 0.5 and 2.5% by weight. If only unsaturated polyester polyalcohols are used as the starting components, then one attains in general solid reaction products which are miscible with fluid, saturated, unmodified polyester polyalcohols and so may be diluted. If mixtures of unsaturated and saturated polyester polyalcohols are modified, then the weight ratio should lie between 1:0 and 1:10, preferably 1:3 to 1:7. For modification, a weight ratio of polyamine to polyester polyalcohol of 0.5:100 to 30:100 should preferably be maintained. A weight ratio of 4:100 to 15:100 is preferred.

The polyester polyalcohol modified according to the invention, especially the products which have been manufactured out of mixtures of unsaturated and saturated polyester polyalcohols, distinguish themselves in addition by an improved miscibility in particular with branched polyether polyalcohols as e.g., polypropylene glycols, with preferably a hydroxide number of between 200 and 400, whereby not only the viscosity of the modified polyester polyalcohol for their use as adhesive components varies according to application, but also their reactivity in relation to polyisocyanates can be regulated.

A further object of the invention is in addition a process for the manufacture of poly(urea)polyurethanes by the reaction of polyester polyalcohols with polyisocyanates, and if necessary further relatively high molecular weight compounds (molecular weight 400 to 10000) with groups reactive to isocyanates and if necessary low molecular weight polyalcohols as chain extending agents, if necessary in the presence of catalysts and further additives in a known manner. In this process the polyesters modified by amino and amido groups are used at an amount of at least 20% by weight, and preferably at least 50% by weight of the polyester polyalcohol components.

For this purpose aliphatic, cycloaliphatic, araliphatic, aromatic and heterocyclic polyisocyanates can be used as isocyanate components, as described e.g., by W. Siefken in Justus Leibigs Annalen der Chemie, 562, pages 75–136, for example ethylenediisocyanate, 1,4-tetramethylenediisocyanate, 1,6-hexamethylenediisocyanate, 1,12-dodecanediisocyanate, cyclobutane-1,3-diisocyanate-cyclohexane-1,3- and -1,4-diisocyanate and any mixtures of these isomers, 1-isocyanato-3,3,5-trimethyl-5 isocyanato-methylcyclohexane (DAS 1 202 785, U.S. Pat. No. 3,401,190), 2,4- and 2,6-hexahydrotoluylenediisocyanate and any mixtures of these isomers, hexahydro-1,3- and/or -1,4-phenylenediisocyanate, perhydro-2,4'- and/or -4,4'-diphenylmethanediisocyanate, 1,3 and 1,4-phenylenediisocyanate, 2,4- and 2,6-toluylenediisocyanate and any mixtures of these isomers, diphenylmethane-2,4'- and/or -4,4-diisocyanate, naphthylene-1,5-diisocyanate, triphenylmethane-4,4',4"-triisocyanate, polyphenylpolymethylenepolyisocyanate, as are obtained through aniline-formaldehyde-condensation and subsequent phosgenation and are described e.g., in the British Pat. Nos. 874 430 and 848 671, m- and p-isocyanatophenylsulfonyl-isocyanate in accordance with the U.S. Pat. No. 3,454,606, perchlorinated arylpolyisocyanate, as are described e.g., in the German AS 1 157 601 (U.S. Pat. No. 3,277,138), polyisocyanate, containing carbodiimide groups, as are described in the German Pat. No. 1 092 007 (U.S. Pat. No. 3,152,162), diisocyanates, as are described in the U.S. Pat. No. 3,492,330, polyisocyanates containing allophanate groups, as are described e.g., in the British Pat. No. 994 890, the Belgium Pat. No. 761 626 and the published Dutch Patent application No. 7 102 524, polyisocyanates containing isocyanate groups, as are described e.g., in the U.S. Pat. No. 3,001,973, in the German Pat. Nos. 1 002 789, 1 222 067 and 1 027 394 and in the German OS Nos. 1 929 034 and 2 004 048, polyisocyanates containing urethane groups, as are described in e.g., the Belgium Pat. No. 752 261 or in the U.S. Pat. No. 3,394,164, polyisocyanates containing acylated urea groups according to the German Pat. No. 1 230 778, polyisocyanates containing biuret groups, as are described e.g., in the German Pat. No. 1 101 394 (U.S. Pat. Nos. 3,124,605 and 3,201,372) as well as in the British Pat. No. 889 050, polyisocyanates manufactured through telomerization reactions, as are described e.g., in the U.S. Pat. No. 3,654,106, polyisocyanates containing ester groups, as are known from e.g., the British Pat. Nos. 965 474 and 1 072 956, the U.S. Pat. No. 3,567,763 and the German Pat. No. 1 231 688, reaction products of the above-mentioned isocyanates with acetals according to the German Pat. No. 1 072 385 and polyisocyanates containing polymeric fatty acid residues according to the U.S. Pat. No. 3,455,883.

It is also possible to use the distillation residues containing isocyanate groups that result from the industrial manufacture of isocyanate, if necessary dissolved in one or more of the above-mentioned polyisocyanates. Further, it is possible to use any mixtures of the above-mentioned polyisocyanates.

As a rule, the technically easy accessible polyisocyanates e.g. the 2,4- and 2,6-toluyenediisocyanate and any mixtures of these isomers ("TDI"), polyphenylpolymethylene polyisocyanates, as are produced by Aniline-Formaldehyde condensation and subsequent phosgenation ("crude MDI") and polyisocyanates containing carbodiimide groups, urethane groups, allophanate groups, isocyanurate groups, urea groups, or biuret groups ("modified polyisocyanates") are particularly preferred. Fluid polyisocyanates such as 4,4'-diisocyanatodiphenylmethane or the commercial mixture 2,4-diisocyanatotoluol or the commercial mixtures hexamethylenediisocyanate or isophoronediisocyanate are especially preferred.

If necessary, starting components with at least two hydrogen atoms reactive to isocyanates with a molecular weight as a rule of 400 to 40000 according to the invention, are, used together with compounds containing amino groups or carboxyl groups, preferably further polyhydroxyl compounds, in particular compounds containing 2 to 8 hydroxyl groups, especially such with a molecular weight of 800 to 40000, preferably 1000 to 8000, e.g., polyesters or polyethers containing at least 2, as a rule 2 to 8, preferably 2 to 4 hydroxyl groups, as are known for the manufacture of homogeneous polyurethane.

The polyesters containing hydroxyl groups in question, are e.g., reaction products of polyvalent, preferably bi-valent and if necessary additionally tri-valent alcohols with polyvalent, preferably bivalent carbonic acids. Instead of the free polycarbonic acids, the corresponding polycarbonic acid anhydrides or corresponding polycarbonic acid esters of low alcohols or their mixtures may be used in the manufacture of the polyesters. The polycarbonic acids can be of an aliphatic, cycloaliphatic, aromatic and/or heterocyclic nature and if necessary, be substituted e.g. by Halogen atoms and/or unsaturated.

As examples of such carbonic acids and their derivatives, the following may be named:

succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylenetetrahydrophthalic acid anhydride, glutaric acid anhydride, maleic acid, maleic acid anhydride, fumaric acid, dimerised and trimerised unsaturated fatty acids, if necessary mixed with monomeric unsaturated fatty acids, such as olaic acid; terephthalic acid dimethylester and terephthalic acid-bis-glycolester. As polyvalent alcohols may be used, e.g, ethylene glycol, propylene glycol-(1,3), butylene glycol-(1,4) and -(2,3), hexanediol -(1,6), octanediol-(1,8), neopentyl glycol, 1,4-bis-hydroxymethylcyclohexane, 2-methyl-1,3-propanediol, glycerine, trimethylolpropane, hexanetriol-(1,2,6). butanetriol-(1,2,4), trimethylolethane, pentaerythrite, quinitol, mannitol and sorbitol, formitol, methylglycloside, further diethylene glycol, triethylene glycol, dipropylene glycol and higher poplypropylene glycols, and dibutylene glycol and higher poplybutylene glycols. The polyesters may contain a proportion of terminal carboxyl groups. Also utilisable are polyesters of lactones e.g., ε-caprolactone, or of hydroxycarbonic acids, e.g. ω-hydroxycapronic acid.

Preferably those polyester polyalcohols are used which are also used in the manufacture of the modified polyester polyalcohols.

As polyether polyalcohols in addition to oligoethylene glycols and oligopropylene glycols, polyethers with at least 2, in general 2 to 8, preferably 2 to 3 hydroxyl groups are used as prepared according to known processes e.g. by polymerisation of epoxy resins such as ethylene oxide, propylene oxide, butylene oxide, tetrahydrofuran, styrene oxide or epichlorohydrin with itself, e.g. in the presence of $BF_3$, or by the addition of these epoxides, if necessary in mixture or one after the other, as starting components with reactive hydrogen atoms such as water, alcohols or amines, e.g. ethylene glycol, propylene glycol-(1,3) or -(1,2), trimethylolpropane, 4,4-dihydroxydiphenylpropane, aniline, ammonia, ethanolamine or ethylenediamine. Also sucrose polyethers as are described e.g. in the German Pat. Nos. 1 176 358 and 1 064 938, may be considered. Preferably branched polyether polyalcohols such as polypropylene glycol are added.

The chain lengthening agents with molecular weights from 32 to 400 according to the invention to be used if necessary are tose of a known kind. Equally, they contain at least 2, preferably 2 or 3 groups reactive to isocyanates. The following are named as examples of such compounds; ethylene glycol, propylene glycol-(1,2) and -(1,3), butylene glycol -(1,4) and -(2,3), pentanediol-(1,5), hexanediol-(1,6), octanediol-(1,8), neopentyl glycol, 1,4-bis-hydroxymethyl-cyclohexane, 2-methyl-1,3-propandiol, glycerine, trimethylolpropane, hexanetriol-(1,2,6), trimethylolethane, pentaerythrite, quinitol, mannitol and sorbitol, diethylene glycol, triethylene glycol, tetraethylene glycol, polyethylene glycols, with a molecular weight of up to 400, dipropylene glycol, polypropylene glycols with a molecular weight of up to 400, dibutylene glycol, polybutylene glycols with a molecular weight of up to 400, 4,4',-dihydroxydiphenylpropane, di-hydroxymethyl-hydro quinone, ethanolamine, diethanolamine, triethanolamine and 3-amino-propanol.

The reaction components for the manufacture of the polyurethane can be brought to a reaction according to the known single step process, the prepolymer process or the semiprepolymer process. Particulars about workapparatus, which are also to be considered according to the invention, are described in the Kunststoff-Handbuch, Volume VII, published by Viewig and Höchtlen, Carl Hanser Verlag, München 1966, e.g. on pages 121 to 205.

Preferably the polyester polyalcohols, modified according to the invention are used for the manufacture of adhesives on a PU-Basis, which react quickly at room temperature and cause no environmental damage through organic amino components. There, the following process is used:

In the simplest case the components are mixed one after the other discontinuously in a stirring apparatus vessel, where the polyisocyanate component must always be added last. With highly reactive mixtures with a very short pot life it is applicable to introduce the component through a feeding system into a mixer casing or a mixing zone, e.g. in the form of a static mixture.

In what follows the starting materials used in the examples are more closely described and characterised.

UPE 1/unsaturated polyester 1
was produced by the reaction of 647 g of maleic acid anhydride, 503 g, phthalic acid anhydride and 1400 g of 1,2-propylene glycol. The hydroxyl number was 20. The iodine number was about 34 (mercaptan addition).

UPE 2/unsaturated polyester 2
manufactured by the reaction of 1480 g of maleic acid anhydride, 4440 g adipic acid, 2420 g of ethylene glycol and 850 g of diethylene glycol. The hydroxyl number was 15, the acid number 14. The iodine number (mercaptan addition) was about 23.

PE 1
is a polyethyleneglycol adipate with a functionality of 3, a hydroxyl content of 5.0% and a viscosity according to Brookfield at 20°=20000 mPa.s.

with and without the addition of catalyst (Table 1). While PE 1 and PE 2 both with or without the addition of a catalyst after 1 hour do not effect a sufficient resistance (0 or 0.5 MPa on SMC), the adhesion of the PU according to the invention was already firm (2.8 MPa).

TABLE 1

| | | | | | | Shear Strength[2] | | | |
|---|---|---|---|---|---|---|---|---|---|
| | | | | mod. | | SMC | | Steel | |
| Example | PE 1 | PE 2 | Cat.[1] | UPE2 | D1 | 1 hr | 72 hr. | 1 hr. | 72 hr. |
| 1α | 33 | — | — | 67 | 40 | 2.8 | 11.8 A | 3.3 | 7.8 |
| 1β | 50 | — | — | 50 | 40 | 0.8 | 12.2 A | 1.3 | 9.5 |
| Comparison | 100 | — | — | — | 40 | 0 | 10.0 A[3] | 0 | 4.9 |
| " | — | 100 | — | — | 30 | 0 | | 0 | 0.5 |
| " | 100 | — | 1.0 | — | 40 | 0.5 | 10.0 A | 0.7 | 7.8 |
| " | — | 100 | 0.7 | — | 30 | 0.2 | 2.8 | 0.1 | 1.8 |

[1]10-percent. Solution of dibutyl Stannic dilaurate (DBTL)
[2]DIN 53 283
[3]A = Tear, Delamination of the SMC (Glass-fiber reinforced polyester resin)

PE2
is a polybutanediol adipate with a hydroxyl content of 3.3% and a viscosity according to Brookfield at 20°–15000 mPa.s.

D1/polyisocyanate 1
is a commercial mixture of diphenylmethanediisocyanate isomers with an NCO-content of 30% and a viscosity of 140 mPa.s. at 25°.

EXAMPLE 1

(a) 2000 g of unsaturated polyester UPE2 were dissolved in 2000 ml of methyl ethyl ketone. Under nitrogen, a solution of 185.6 g of ethylenediamine in 500 ml of methyl ethyl ketone was added in drops over the course of 2 hours at a temperature of 10°. The solution was stirred for 10 hours at room temperature and then the solvent was distilled off in a vacuum (20 Torr). The reaction product had a total nitrogen content of 3.5%, a basic nitrogen content of 1.6% and an iodine number of 1. The viscosity at 20° was 43600 mPa.s. and at 80° 430 mPa.s.

(b) Polyurethane Production
The product was mixed with the quantities of polyester polyalcohol PE1 given in Table 1 and brought to reaction with D1. The mixture was utilized for the adhesion of 2×4 cm plates of glass-fibre reinforced polyester resin (SMC) or steel overlapping by 200 mm[2]. After 1 or 72 hours the shearing strength was determined according to DIN 53 283. For comparison, the unmodified polyesters UPE1 and UPE2 were tested EXAMPLES 2a–15a Aminolysis of Mixtures of the Polyesters The *unsaturated* polyester (UPE1) was mixed with the *saturated* polyester (PE1) in the ratio given (see Table 2) and stirred under nitrogen at 70°. To this mixture ethylenediamine (g amine/100 g PE-mixture) given in the Table 2 was added slowly. After the addition, the reaction mixture was stirred for another 2 hours at 70°, and unreacted ethylenediamine was then distilled off in a vacuum (20 Torr) at the same temperature. the analytical results are summarised in Table 2. The hydroxyl numbers increase with increasing amine quantities (at constant ratio of the esters). Equally, an increase in hydroxyl values may be confirmed with a constant amine quantity, with an increasing polyester ratio. Further, the basic nitrogen content is increased by increasing the amine quantity. Examples 14a and 15a reproduce the reaction of unsaturated polyester (without PE1-addition) with ethylenediamine.

TABLE 2

| Example | Weight-ratio UPE1:PE1 | EDA (g/100 g UPE1 + PE1) | OH—Number | Visc. (Pas. 20°) | % N Total | % N basic | % N calc. | % EDA[1] | Transparency |
|---|---|---|---|---|---|---|---|---|---|
| 2a | 1:1 | 4.5 | | solid | 1.99 | 0.92 | 2.01 | | clear |
| | | | | | 2.00 | 0.99 | | | |
| 3a | 1:1 | 6.0 | 190 | solid | 2.76 | 1.39 | 2.64 | | clear |
| | | | | | 2.60 | 1.30 | | | |
| 4a | 1:1 | 9.0 | 241 | solid | 3.70 | 1.80 | 3.85 | 0.05 | almost clear |
| 5a | 1:2 | 4.5 | 175 | 180 | 1.71 | 0.85 | 2.01 | 0.02 | almost clear |
| 6a | 1:2 | 9.0 | 258 | | 3.60 | 1.60 | 3.85 | 0.02 | very cloudy |
| 7a | 1:2 | 13.5 | 309 | 89 | 5.02 | 1.91 | 5.55 | 0.15 | very cloudy |
| 8a | 1:3 | 4.5 | 192 | 89 | 1.99 | 0.93 | 2.01 | 0.02 | clear |
| 9a | 1:3 | 9.0 | 267 | 62 | 3.71 | 1.57 | 3.85 | 0.05 | clear |
| 10a | 1:3 | 13.5 | 292 | 71 | | | 5.55 | 0.08 | cloudy |
| 11a | 1:5 | 4.5 | 206 | 52 | 2.01 | 0.84 | 2.01 | 0.04 | clear |
| 12a | 1:5 | 9.0 | 275 | 45 | 3.72 | 1.01 | 3.85 | 0.05 | cloudy |
| 13a | 1:5 | 13.5 | 331 | 62 | 5.39 | 1.83 | 5.55 | 0.01 | cloudy |
| 14a | 1:0 | 6.0 | 118 | solid | 1.15 | 0.53 | 2.64 | | very cloudy |
| 15a | 1:0 | 9.0 | 145 | solid | 1.95 | 0.93 | 3.85 | | very cloudy |

[1]EDA = Ethylene Diamine

EXAMPLES 2b–11b

Polyurethane manufacture

By analogy with Example 1b, the modified polyester polyalcohols manufactured according to Examples 2a to 15a, were mixed with the isocyanate D1 and tested for their commercial adhesive characteristics. The in part solid or high viscous substances highly reactive to D1 (Product No. 2a to 11a) were previously mixed with the polyesterdiol PE1 in the weight ratio given in Table 3. In Table 3 the shear strength under various conditions were summarised.

TABLE 3

| Example No. | Product No. | Quantity (g) | PE 1 (g) | (D1) (g) | Pot Life (min) | Adhesion on: SMC after 1 hour | Adhesion on: SMC after 24 hours | 7 Days H$_2$O/60° | Steel after 1 hour | Steel after 24 hours |
|---|---|---|---|---|---|---|---|---|---|---|
| 2b | 2a | 5 | 5 | 4 | 15 | 0.9 | 9.1 A[1] | 6.6 | 1.0 | 7.1 |
| 3b | 3a | 5 | 5 | 4 | 12 | 1.2 | 8.3 A | 5.3 | 1.0 | 6.0 |
| 4b | 6a | 5 | 5 | 4 | 10 | 0.9 | 5.3 | 4.6 | 0.8 | 7.6 |
| 5b | 7a | 5 | 5 | 4 | 5 | 1.0 | 6.2 | 5.3 | 0.8 | 4.1 |
| 6b | 8a | 10 | 5 | 6 | 5 | 2.9 | 8.6 A | 4.5 | — | — |
| 7b | 9a | 10 | — | 4 | 2 | 3.5 | 10.5 | 4.4 | 4.8 | 3.1 |
| 8b | 11a | 10 | — | 4 | 4 | 4.2 | 10.9 A | 3.5 | 4.6 | 7.7 |
| 9b | 11a | 10 | 5 | 6 | 12 | 1.0 | 10.0 A | 4.2 | — | — |
| 10b | 12a | 19 | — | 4 | 3 | 3.9 | 9.8 | 1.1 | 4.6 | 4.9 |
| 11b | 13a | 10 | — | 4 | 3 | 2.0 | 6.5 | 0.5 | 3.8 | 4.7 |

[1] A = Tear, Delamination of the SMC

EXAMPLES 16 AND 17

(a) 16.2 g of ethylenediamine in 50 ml of methylethylketone were added slowly to 200 g of polyester UPE2 in 200 ml of methyl ethyl ketone under nitrogen at 10°. Subsequently, the mixture was stirred for 10 hours at 25°. After distilling off the solvent, a yellow resin was obtained (N=3.3%; N bas.=1.51%), which was diluted with various polyester polyalcohols.

(b) By analogy with Example 1b adhesives were manufactured by mixture with isocyanate D1, whose results are summarised in Table 4.

TABLE 4

| Example | mod. UPE2 (g) | PE 1 (g) | PE 2 (g) | D 1 (d) | Pot Life (min.) | Shear Strength SMC 1 hr. | Shear Strength 24 hrs. | Shear Strength Steel 1 hr. | Shear Strength 24 hrs. |
|---|---|---|---|---|---|---|---|---|---|
| 16 | 5 | 5 | — | 4 | 20 | 1.6 | 9.9 A | 1.2 | 7.3 |
| 17 | 5 | — | 5 | 4 | 20 | 1.2 | 8.2 A | 0.9 | 5.8 |

EXAMPLE 18

(a) 400 g UPE1 were dissolved in 400 ml ethyl acetate. A solution of 18.4 g of ethylenediamine in 50 ml of ethyl acetate was added in drops, under nitrogen, at 10°, warmed to room temperature and then stirred for 3 hours. After the removal of the solvent by distillation in a vacuum at 60° a viscous product was obtained, N=1.93%, N-bas.=0.84% (thereof N-sec. 0.70%), hydroxyl number 53, iodine number 22.

(b) After admixture with the polyester PE2 in quantities analogous with Example 1, adhesions of SMC-Plates were carried out with the addition of 4 g polyisocyanate D1 per 10 g of the mixture. The pot life of the mixture was 18 minutes. The shear strength after 1 hour at room temperature was 2.2 MPa, after 24 hours 8.9 (Delamination).

What is claimed is:

1. Process for the manufacture of polyester polyalcohols with amino and amide groups by the reaction of polyester polyalcohols with polyamines, characterised in that unsaturated polyester polyalcohols if necessary in admixture with saturated polyester polyalcohols are used as polyester polyalcohols, and low molecular weight, aliphatic polyamines with two primary amino groups are used as polyamines.

2. Process according to claim 1, wherein an alkylenediamine, preferably ethylene- or hexamethylenediamine is used as the polyamine.

3. Process for preparing poly(urea)polyurethanes by the reaction of polyester polyalcohols with polyisocyanates, and if necessary further relatively high molecular weight compounds with groups reactive to isocyanates and, if necessary, low molecular weight polyalcohols as chain lengthening agents, if necessary in the presence of catalysts and further additives in a known manner, characterised in that at least 20 Weight-% polyester polyalcohols, obtained in accordance with claim 1 are used as polyester polyalcohol components.

4. Process for preparing poly(urea)polyurethanes by the reaction of polyester polyalcohols with polyisocyanates, and if necessary further relatively high molecular weight compounds with groups reactive to isocyanates and, if necessary, low molecular weight polyalcohols as chain lengthening agents, if necessary in the presence of catalysts and further additives in a known manner, characterised in that at least 20 Weight-% polyester polyalcohols, obtained in accordance with claim 2 are used as polyester polyalcohol components.

* * * * *